(12) United States Patent
Otana et al.

(10) Patent No.: US 11,273,652 B2
(45) Date of Patent: Mar. 15, 2022

(54) SENSOR UNIT AND IMAGE FORMING APPARATUS EQUIPPED WITH SAME

(71) Applicant: KYOCERA Document Solutions Inc., Osaka (JP)

(72) Inventors: Aiichiro Otana, Osaka (JP); Naoto Miyakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 199 days.

(21) Appl. No.: 16/431,201

(22) Filed: Jun. 4, 2019

(65) Prior Publication Data

US 2019/0375217 A1    Dec. 12, 2019

(30) Foreign Application Priority Data

Jun. 12, 2018  (JP) .............................. JP2018-112038
Jun. 12, 2018  (JP) .............................. JP2018-112040
Jun. 12, 2018  (JP) .............................. JP2018-112044
Jun. 12, 2018  (JP) .............................. JP2018-112045

(51) Int. Cl.
  *B41J 11/00*    (2006.01)
  *F21V 8/00*    (2006.01)
  *B65H 7/14*    (2006.01)

(52) U.S. Cl.
  CPC ............ *B41J 11/0095* (2013.01); *B65H 7/14* (2013.01); *G02B 6/0031* (2013.01); *B65H 2553/414* (2013.01)

(58) Field of Classification Search
  CPC .. B41J 11/0095; B65H 7/14; B65H 2553/414; G02B 6/0031
  See application file for complete search history.

(56) References Cited

U.S. PATENT DOCUMENTS

| 4,686,374 | A | * | 8/1987 | Liptay-Wagner | .... G01B 11/024 250/559.08 |
| 5,450,211 | A | * | 9/1995 | Kanai | .................. G02B 26/126 358/401 |
| 6,105,954 | A | * | 8/2000 | Magee | ................. B65H 3/0661 271/10.03 |
| 6,111,261 | A | * | 8/2000 | Bolza-Schunemann | ..................... B41M 3/14 250/559.08 |
| 6,737,665 | B1 | * | 5/2004 | Kinrot | ...................... B65H 7/14 250/559.36 |
| 2004/0252353 | A1 | * | 12/2004 | Sano | .................. H04N 1/00681 358/474 |
| 2005/0179960 | A1 | * | 8/2005 | Obana | .................. H04N 1/0402 358/449 |

(Continued)

FOREIGN PATENT DOCUMENTS

JP    2006-78927 A    3/2006

*Primary Examiner* — David H Banh
(74) *Attorney, Agent, or Firm* — Stein IP, LLC

(57) ABSTRACT

A sensor unit includes an edge detection sensor and an illumination device. The edge detection sensor is disposed in a conveying path of a recording medium and detects a recording medium edge position in a width direction perpendicular to a conveying direction. The illumination device is disposed to face the edge detection sensor in the conveying path and emits light toward the edge detection sensor. The illumination device includes a light source and a diffuser. The light source emits light. The diffuser diffuses the light from the light source and suppresses luminance unevenness.

19 Claims, 16 Drawing Sheets

(56) References Cited

U.S. PATENT DOCUMENTS

| | | | |
|---|---|---|---|
| 2005/0185229 A1* | 8/2005 | Sano | H04N 1/00702 358/498 |
| 2009/0208065 A1* | 8/2009 | Miura | H04N 1/00681 382/112 |
| 2010/0079740 A1* | 4/2010 | Takahashi | G03B 27/72 355/71 |
| 2011/0074906 A1* | 3/2011 | Imai | B41J 3/407 347/218 |
| 2012/0001386 A1* | 1/2012 | Nishikata | B65H 7/14 271/265.01 |
| 2012/0082483 A1* | 4/2012 | Nakatsu | G03G 21/1666 399/177 |
| 2015/0028533 A1* | 1/2015 | Kato | B65H 7/14 271/3.16 |
| 2015/0185673 A1* | 7/2015 | Atay | B65H 7/02 399/389 |
| 2016/0026140 A1* | 1/2016 | Oomoto | G03G 15/6529 399/323 |
| 2016/0274293 A1* | 9/2016 | He | G02B 6/0091 |
| 2017/0269285 A1* | 9/2017 | Hirayama | G02B 6/0036 |

* cited by examiner

SENSOR UNIT AND IMAGE FORMING APPARATUS EQUIPPED WITH SAME

INCORPORATION BY REFERENCE

This application is based upon and claims the benefit of priority from the corresponding Japanese Patent Application Nos. 2018-112038, 2018-112040, 2018-112044, and 2018-112045 filed Jun. 12, 2018, the entire contents of which are hereby incorporated by reference.

BACKGROUND

The present disclosure relates to a sensor unit including a sensor for detecting an edge of a sheet-like recording medium, mounted on an image forming apparatus such as a facsimile, a copier, or a printer, and to an image forming apparatus equipped with the sensor unit.

An image forming apparatus such as a facsimile, a copier, or a printer is configured to record an image on a recording medium such as paper, cloth, or an OHP sheet. Such image forming apparatuses can be classified into an electrophotographic type, an ink-jet type, and the like based on their recording methods.

When the image forming apparatus performs printing on recording media, if the recording media have positional displacements in a direction perpendicular to the medium conveying direction (in a width direction), printing positions on the recording media are shifted differently. Therefore, a high accuracy of printing position is required for each page in a case where binding is performed after printing or other cases. In particular, when using an ink-jet printer, ink tends to soak into the recording medium resulting in show-through on the other side, and hence very high accuracy (e.g. less than a fraction of one millimeter) is required to the printing position in double-sided printing.

Therefore, conventionally, there is a known image forming apparatus, which includes an edge detection sensor constituted of a contact image sensor (CIS) or the like, which is disposed to face a sheet conveying path (conveying path of a recording medium) so as to detect a sheet width direction end position utilizing reflected light, and an illumination device disposed on the same side as the edge detection sensor with respect to the sheet conveying path so as to emit light toward the sheet conveying path. This image forming apparatus detects the sheet width direction end position based on a light intensity difference between presence and absence of a paper sheet when the edge detection sensor receives the light.

However, there may be a case where the conventional image forming apparatus, in which the illumination device is disposed on the same side as the edge detection sensor with respect to the sheet conveying path as described above, cannot detect the width direction end position depending on the paper sheet color. Specifically, for example, if the paper sheet has white color while outside of the paper sheet (sheet non-passing area) is black color, a light intensity difference between the reflected light from the paper sheet and the reflected light from the sheet non-passing area is large, and hence the edge detection sensor can detect a sheet width direction end position. In contrast, for example, if the paper sheet has black color and the sheet non-passing area also has black color, a light intensity difference between the reflected light from the paper sheet and the reflected light from the sheet non-passing area is small, and hence the edge detection sensor cannot detect a sheet width direction end position.

In order to improve this disadvantage, there is a known image forming apparatus including an edge detection sensor constituted of a contact image sensor (CIS) or the like, which is disposed to face a sheet (recording medium) conveying path so as to detect a sheet width direction end position, and an illumination device disposed to face the edge detection sensor in the sheet conveying path so as to emit light toward the sheet conveying path. This image forming apparatus can detect a sheet width direction end position based on a light intensity difference between presence and absence of a paper sheet when the edge detection sensor receives the light.

Note that an image forming apparatus, which is equipped with an edge detection sensor for detecting a sheet width direction end position and an illumination device disposed to face the edge detection sensor in the sheet conveying path, is conventionally disclosed.

However, in the above-mentioned conventional image forming apparatus in which the illumination device is disposed to face the edge detection sensor in the sheet conveying path, the edge detection sensor does not receive the reflected light from the paper sheet, unlike the image forming apparatus in which the illumination device is disposed on the same side as the edge detection sensor with respect to the sheet conveying path. In other words, the edge detection sensor directly receives the light emitted from the illumination device. Therefore if the light emitted from the illumination device has unevenness, the light intensity difference becomes large when the light emitted from the illumination device is directly received by the edge detection sensor. As a result, there occurs a problem that a sheet width direction end position is misdetected.

SUMMARY

A sensor unit according to one aspect of the present disclosure includes an edge detection sensor and an illumination device. The edge detection sensor is disposed in a conveying path of a recording medium to detect a recording medium edge position in a width direction perpendicular to a conveying direction. The illumination device is disposed to face the edge detection sensor in the conveying path and emits light toward the edge detection sensor. The illumination device includes a light source, and a diffuser. The light source emits light. The diffuser diffuses the light from the light source and suppresses luminance unevenness.

DETAILED DESCRIPTION

Hereinafter, embodiments of the present disclosure are described with reference to the drawings.

First Embodiment

Figure 1:
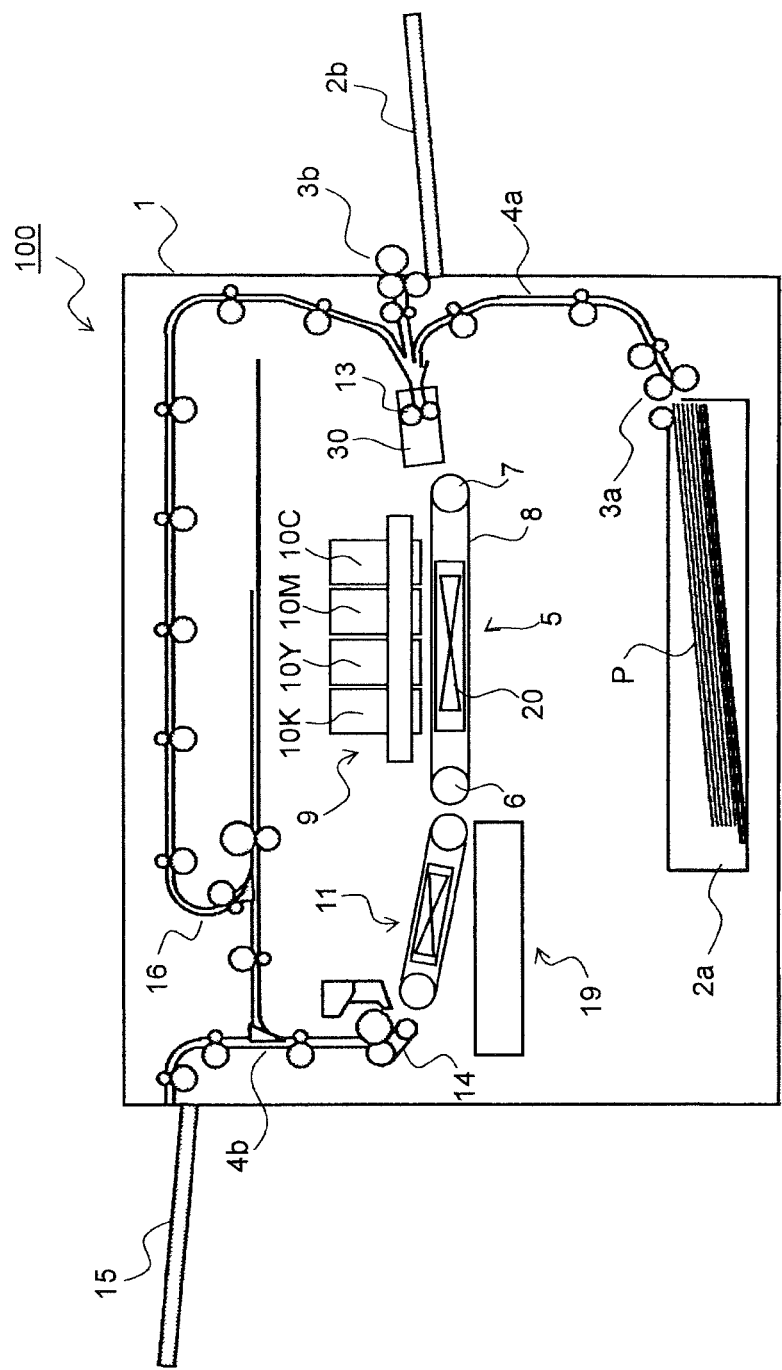
FIG. 1 is a cross-sectional side view showing a schematic structure of a printer 100 equipped with a sensor unit 30 according to a first embodiment of the present disclosure.

FIG. 1 is a cross-sectional side view showing a schematic structure of an ink-jet recording type printer (image forming apparatus) 100 equipped with a sensor unit 30 according to a first embodiment of the present disclosure.

As shown in FIG. 1, the printer 100 includes a sheet feed cassette 2a as a sheet storage unit disposed in a lower part inside a printer main body 1, and a manual paper feed tray 2b disposed on the outside of the right surface of the printer main body 1. A sheet feeding device 3a is disposed above on the sheet conveying direction downstream side of the sheet feed cassette 2a (on the right side of the sheet feed cassette 2a in FIG. 1). In addition, a sheet feeding device 3b is disposed on the sheet conveying direction downstream side of the manual paper feed tray 2b (on the left side of the manual paper feed tray 2b in FIG. 1). These sheet feeding devices 3a and 3b work so that a paper sheet (recording medium) P is separated from other sheets and is sent out one by one.

In addition, a first sheet conveying path 4a is formed inside the printer 100. The first sheet conveying path 4a is positioned at the upper right of the sheet feed cassette 2a and at the left of the manual paper feed tray 2b. The paper sheet P sent out from the sheet feed cassette 2a goes through the first sheet conveying path 4a and is conveyed upward in the vertical direction along the side surface of the printer main body 1, while the paper sheet sent out from the manual paper feed tray 2b goes through the first sheet conveying path 4a and is conveyed to the left in the substantially horizontal direction.

The downstream end portion of the first sheet conveying path 4a in the sheet conveying direction is provided with the sensor unit 30 to detect an end position (edge position) of the paper sheet P in the width direction (perpendicular to the sheet conveying direction). Further, a first belt conveyor unit 5 and a recording unit (image forming unit) 9 are disposed just near the downstream side of the sensor unit 30.

The sensor unit 30 is provided with a registration roller pair 13. The registration roller pair 13 corrects skewing of the paper sheet P and sends out the paper sheet P to the first belt conveyor unit 5 in synchronization with an ink ejection operation performed by the recording unit 9. A detailed structure of the sensor unit 30 will be described later.

The first belt conveyor unit 5 includes an endless first conveyor belt 8 wound around a first drive roller 6 and a first driven roller 7. The first conveyor belt 8 is provided with many through holes for sucking air (not shown). The paper sheet P sent out from the registration roller pair 13 is sucked and held on the first conveyor belt 8 with a sheet suction unit 20 disposed inside the first conveyor belt 8 and passes below the recording unit 9.

The recording unit 9 includes a line heads 10C, 10M, 10Y, and 10K. The line heads 10C to 10K records an image on the paper sheet P sucked, held and conveyed on a conveyance surface of the first conveyor belt 8. The line heads 10C to 10K are respectively supplied with four color (cyan, magenta, yellow, and black) inks stored in ink tanks (not shown) for individual colors of the line heads 10C to 10K.

The line heads 10C to 10K eject corresponding ink sequentially to the paper sheet P sucked on the first conveyor belt 8, and yellow, magenta, cyan, and black color inks are superimposed to record a full color image on the paper sheet P. Note that the printer 100 can also record a monochrome image.

A second belt conveyor unit 11 is disposed on the downstream side (the left side in FIG. 1) of the first belt conveyor unit 5 in the sheet conveying direction. The paper sheet P with the image recorded by the recording unit 9 is sent to the second belt conveyor unit 11, and the ink ejected to the surface of the paper sheet P is dried while passing through the second belt conveyor unit 11. A structure of the second belt conveyor unit 11 is the same as that of the first belt conveyor unit 5, and description thereof is omitted.

A decurler unit 14 is disposed on the downstream side of the second belt conveyor unit 11 in the sheet conveying direction and near the left side surface of the printer main body 1. After the ink is dried on the second belt conveyor unit 11, the paper sheet P is sent to the decurler unit 14, and a curl of the paper sheet P is corrected.

A second sheet conveying path 4b is formed on the downstream side (the upper part in FIG. 1) of the decurler unit 14 in the sheet conveying direction. When double-sided recording is not performed, the paper sheet P after passing through the decurler unit 14 is discharged from the second sheet conveying path 4b via a discharge roller pair onto a sheet discharge tray 15 disposed on the outside of the left surface of the printer 100. When printing on both sides of the paper sheet P, the paper sheet P after recording on one side is finished and after passing the second belt conveyor unit 11 and the decurler unit 14 passes along the second sheet conveying path 4b and is conveyed to a reverse conveying path 16. The conveying direction of the paper sheet P sent to the reverse conveying path 16 is switched, and the paper sheet P passes above the printer 100 and is conveyed to the registration roller pair 13. After that, the paper sheet P is conveyed to the first belt conveyor unit 5 again in the state where the surface on which an image is not recorded faces upward.

In addition, a maintenance unit 19 is disposed below the second belt conveyor unit 11. When performing maintenance of recording heads of the line heads 10C to 10K, the maintenance unit 19 moves to below the recording unit 9 so as to wipe ink ejected (purged) from ink ejection nozzles of the recording heads and collect the wiped ink.

Figure 2:
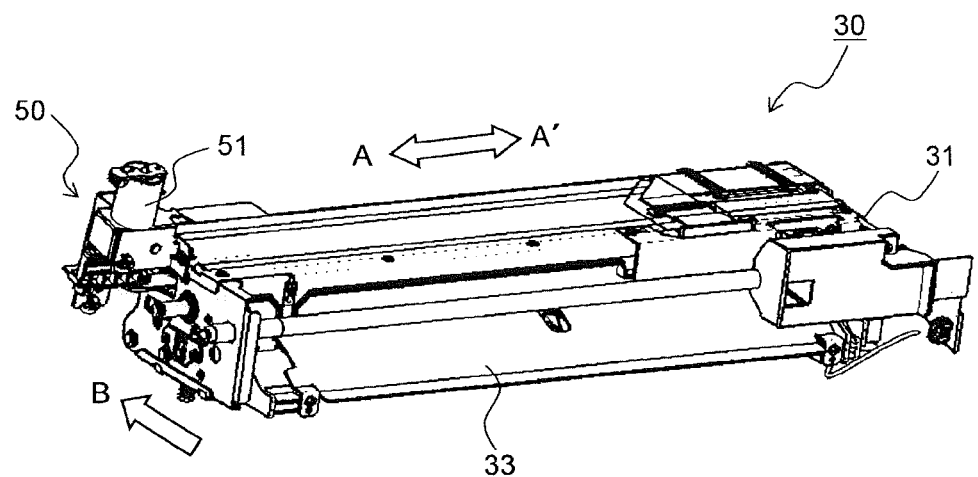
FIG. 2 is a perspective external view of the sensor unit 30 according to the first embodiment of the present disclosure.
Figure 3:
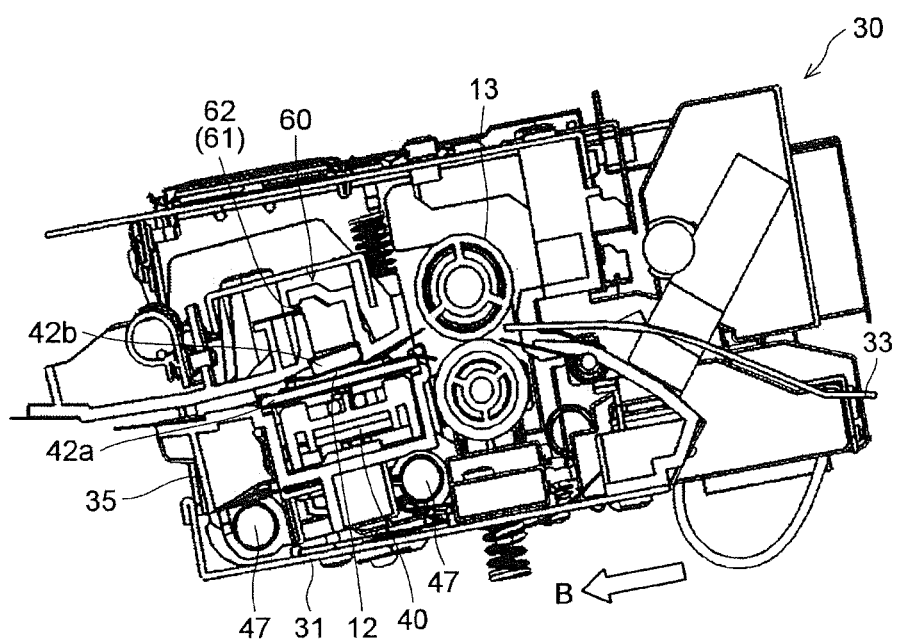
FIG. 3 is a cross-sectional side view of the sensor unit 30 according to the first embodiment of the present disclosure.

Next, a detailed structure of the sensor unit 30 is described. FIG. 2 is a perspective external view of the sensor unit 30 according to the first embodiment of the present disclosure, FIG. 3 is a cross-sectional side view of the sensor unit 30 according to the first embodiment of the present disclosure, and FIG. 4 is a perspective view of a frame constituting a unit housing 31 of the sensor unit 30 according to the first embodiment of the present disclosure.

The sensor unit 30 includes the unit housing 31, the registration roller pair 13, a CIS carriage 35, and a carriage moving mechanism 50. The unit housing 31 supports the registration roller pair 13 in a rotatable manner and supports the CIS carriage 35 in a movable manner in the sheet width direction (arrow AA' direction). The upstream end portion of the unit housing 31 in the sheet conveying direction (arrow B direction) is provided with a registration entrance guide 33, which guides the paper sheet P to a nip portion of the registration roller pair 13.

Figure 4:
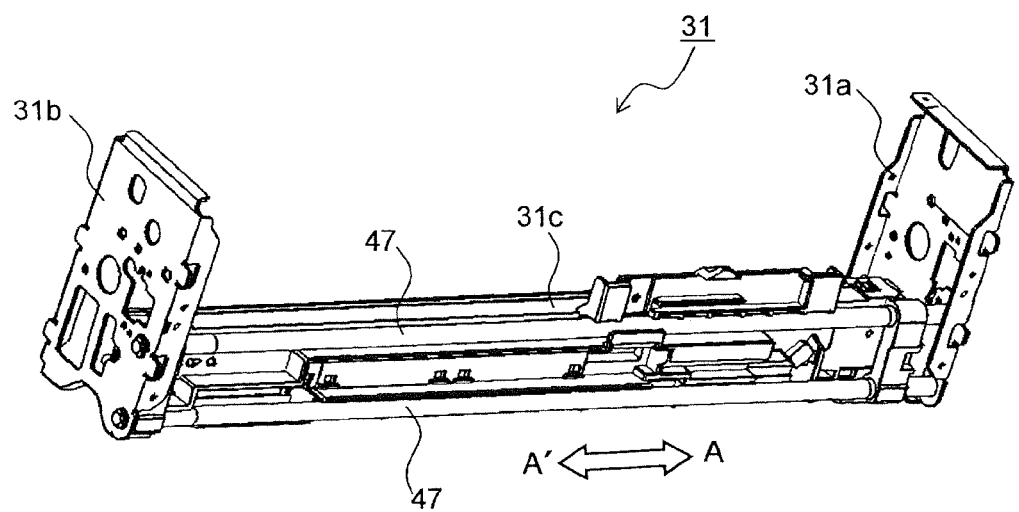
FIG. 4 is a perspective view of a frame constituting a unit housing 31 of the sensor unit 30 according to the first embodiment of the present disclosure.

As shown in FIG. 4, the unit housing 31 includes side face frames 31a and 31b disposed respectively on the front side and the back side of the printer 100, and a connection frame 31c connecting and bridging between the side face frames 31a and 31b. Two shafts 47 for supporting the CIS carriage 35 in a slidable manner are fixed in parallel between the side face frames 31a and 31b.

The CIS carriage 35 is disposed adjacent to the downstream side (left side in FIG. 3) of the registration roller pair 13 in the sheet conveying direction (arrow B direction). The CIS carriage 35 includes a carriage main body 37 (see FIG. 6) housing a CIS (an edge detection sensor) 40 and an illumination device 60. The CIS 40 and the illumination device 60 are housed respectively in the lower part and the upper part inside the carriage main body 37, and two transparent contact glasses 42a and 42b are disposed to face each other between the CIS 40 and the illumination device 60. Further, an upper surface (second surface) of the contact glass (second transparent member) 42a and a lower surface (first surface) of the contact glass (first transparent member) 42b constitute a part of a sheet conveying path (conveying path of a recording medium) 12.

The CIS 40 detects an edge position of the paper sheet P in the width direction based on a light intensity difference between a part in which the light from the illumination device 60 enters and a part in which the light is blocked by the paper sheet P. Note that a detailed structure of the illumination device 60 will be described later.

Figure 5:
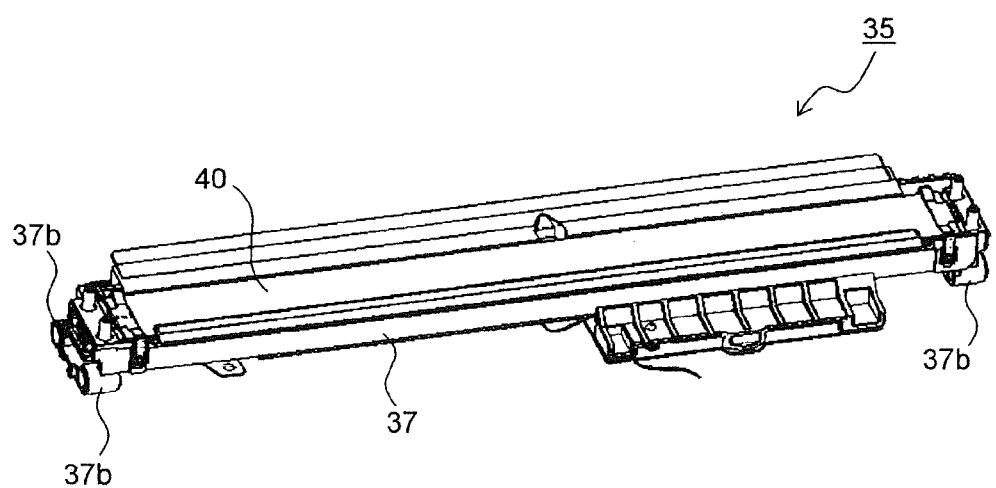
FIG. 5 is a perspective external view of a CIS carriage 35.
Figure 6:
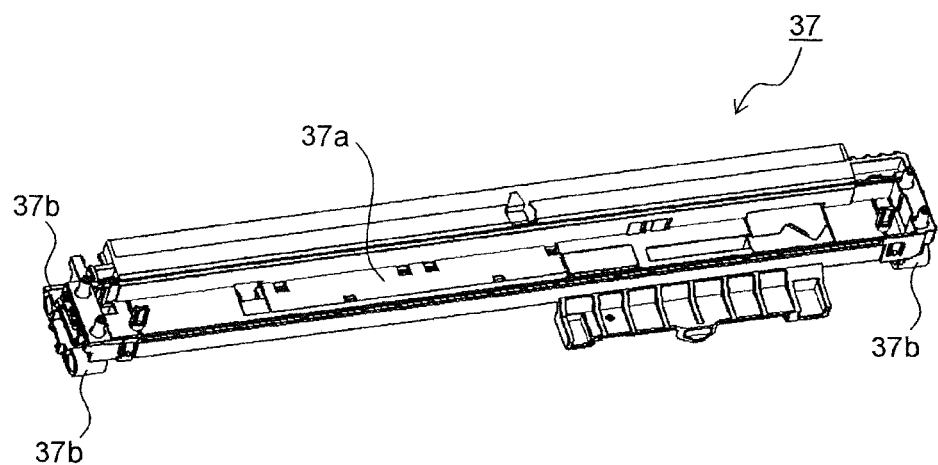
FIG. 6 is a perspective external view of a carriage main body 37 constituting the CIS carriage 35.
Figure 7:
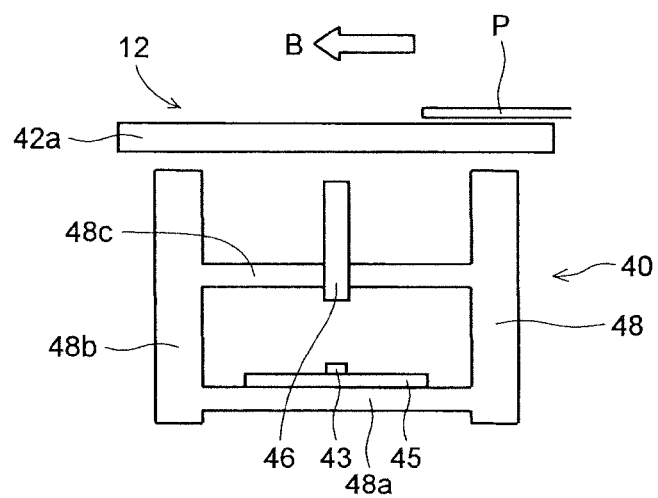
FIG. 7 is a cross-sectional side view showing a structure of a CIS 40 and its vicinity.
Figure 8:
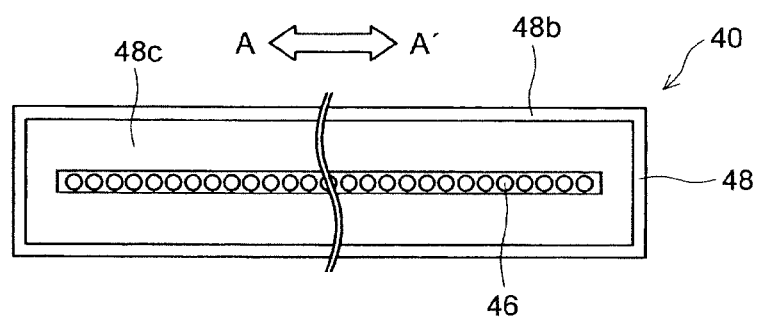
FIG. 8 is a plan view showing the CIS 40 viewed from the upper side.
Figure 9:
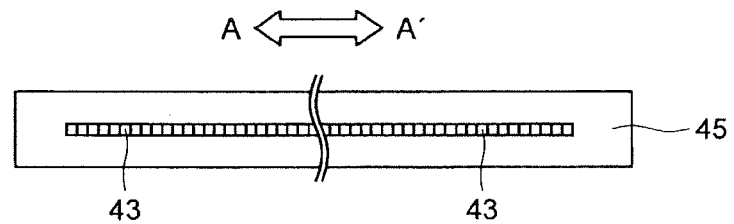
FIG. 9 is a plan view showing a structure of a light receiving part 43 of the CIS 40 and a CIS substrate 45 viewed from the upper side.

FIG. 5 is a perspective external view of the CIS carriage 35, FIG. 6 is a perspective external view of the carriage main body 37 constituting the CIS carriage 35, FIG. 7 is a cross-sectional side view showing a structure of the CIS 40 and its vicinity, FIG. 8 is a plan view of the CIS 40 viewed from the upper side, and FIG. 9 is a plan view of a structure of a light receiving part 43 of the CIS 40 and a CIS substrate 45 viewed from the upper side.

The carriage main body 37 includes a CIS housing portion 37a in which the CIS 40 is housed, and a shaft guide portion 37b in which the shaft 47 of the unit housing 31 is inserted in a slidable manner. The CIS housing portion 37a extends over substantially the entire region of the carriage main body 37 in the longitudinal direction. Two shaft guide portions 37b are disposed at two positions on each end portion of the carriage main body 37 in the longitudinal direction, and two pairs of them are disposed in the sheet conveying direction.

As shown in FIGS. 7 to 9, the CIS 40 includes a plurality of the light receiving parts 43 constituted of photoelectric conversion elements arranged in the sheet width direction (arrow AA' direction) at a predetermined pitch, the CIS substrate 45 having an upper surface on which the light receiving parts 43 are mounted, a rod lens array 46 constituted of a plurality of rod lenses arranged in the sheet width direction, and a CIS case 48 housing them.

The CIS case 48 includes a bottom surface portion 48a, side surface portions 48b extending upward from edges of the bottom surface portion 48a, and a support face portion 48c disposed with a predetermined distance from the bottom surface portion 48a. The CIS substrate 45 is fixed on the bottom surface portion 48a. The rod lens of the rod lens array 46 is formed in a cylindrical shape and is disposed on the sheet conveying path 12 side (upper side) of the light receiving part 43. In addition, the rod lens array 46 penetrates the support face portion 48c and is fixed to the same with a predetermined distance from the light receiving part 43. The rod lens array 46 guides the light from the illumination device 60 to the light receiving part 43.

Next, a detailed structure of the illumination device 60 is described.

Figure 10:
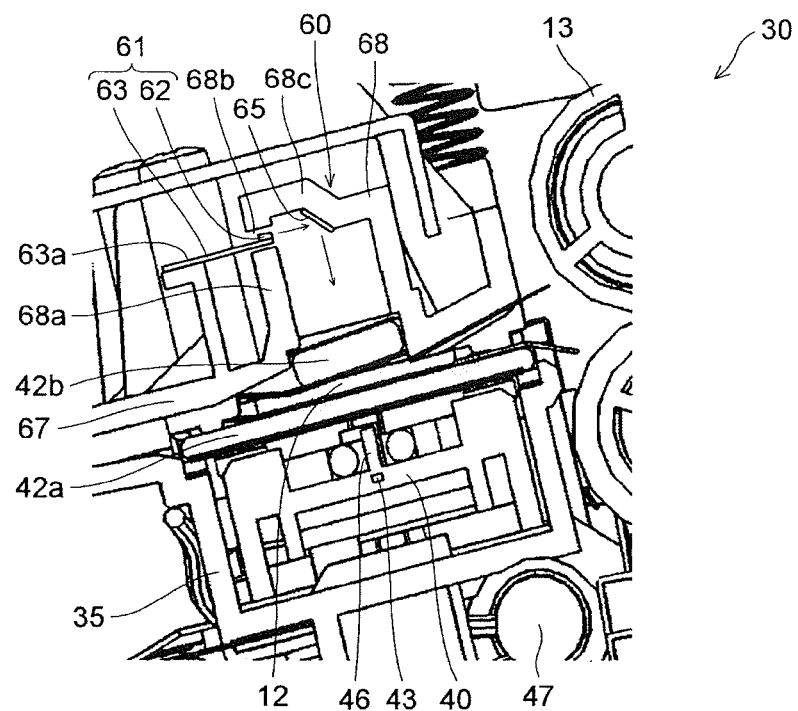
FIG. 10 is a cross-sectional side view showing a structure of an illumination device 60 and its vicinity of the sensor unit 30 according to the first embodiment of the present disclosure.

As shown in FIG. 10, the illumination device 60 includes an LED array (light source array) 61, a sheet-like diffuser 65 for diffusing light from the LED array 61 so as to emit the light to the CIS 40, and an illumination case 67 retaining them.

Figure 11:
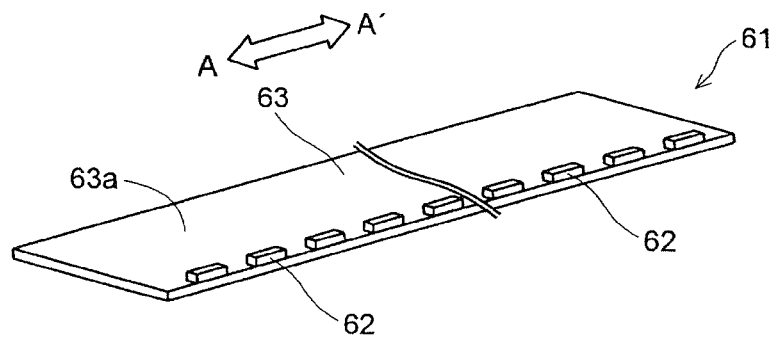
FIG. 11 is a perspective view showing a structure of an LED array 61 of the illumination device 60 of the first embodiment of the present disclosure.

As shown in FIGS. 10 and 11, the LED array 61 includes a plurality of LEDs (light sources) 62 arranged at a predetermined space in the sheet width direction, and an LED substrate (light source substrate) 63 having a mount surface 63a on which the LEDs 62 are mounted. In this embodiment, the plurality of LEDs 62 emit light in parallel to the mount surface 63a of the LED substrate 63 and along the sheet conveying direction. The mount surface 63a of the LED substrate 63 is disposed along the sheet conveying direction (in this example, in parallel to the sheet conveying path 12). Note that the LED substrate 63 is fixed to the illumination case 67 with screws or the like (not shown), and the contact glass 42*b* is fixed to the illumination case 67 with clips or the like (not shown).

The illumination case 67 has a function as a sheet guide constituting a part of the sheet conveying path 12. The illumination case 67 includes a stay 68 protruding in a direction retreating from the sheet conveying path 12 (in the upward direction). The stay 68 extends in the sheet width direction and is formed to have a substantially rectangular cross section opening downward and surrounded by an upper surface portion 68*c* and a pair of side surface portions. A side surface portion 68*a* of the stay 68 in the sheet conveying direction downstream side is provided with a slit 68*b* formed to extend in the sheet width direction. The LED array 61 is disposed in the slit 68*b* and the light enters an inside space of the stay 68. The inner surface of the upper surface portion 68*c* of the stay 68 (upper surface of the inside space) is provided with an inclined surface on which the diffuser 65 is fixed.

The light emitted from the LED 62 is diffused and reflected by the diffuser 65 and passes through the contact glasses 42*b* and 42*a* so as to irradiate the CIS 40. Note that the diffuser 65 in this embodiment is a reflection type diffuser, which reflects the light from the LED 62 toward the CIS 40.

Figure 12:
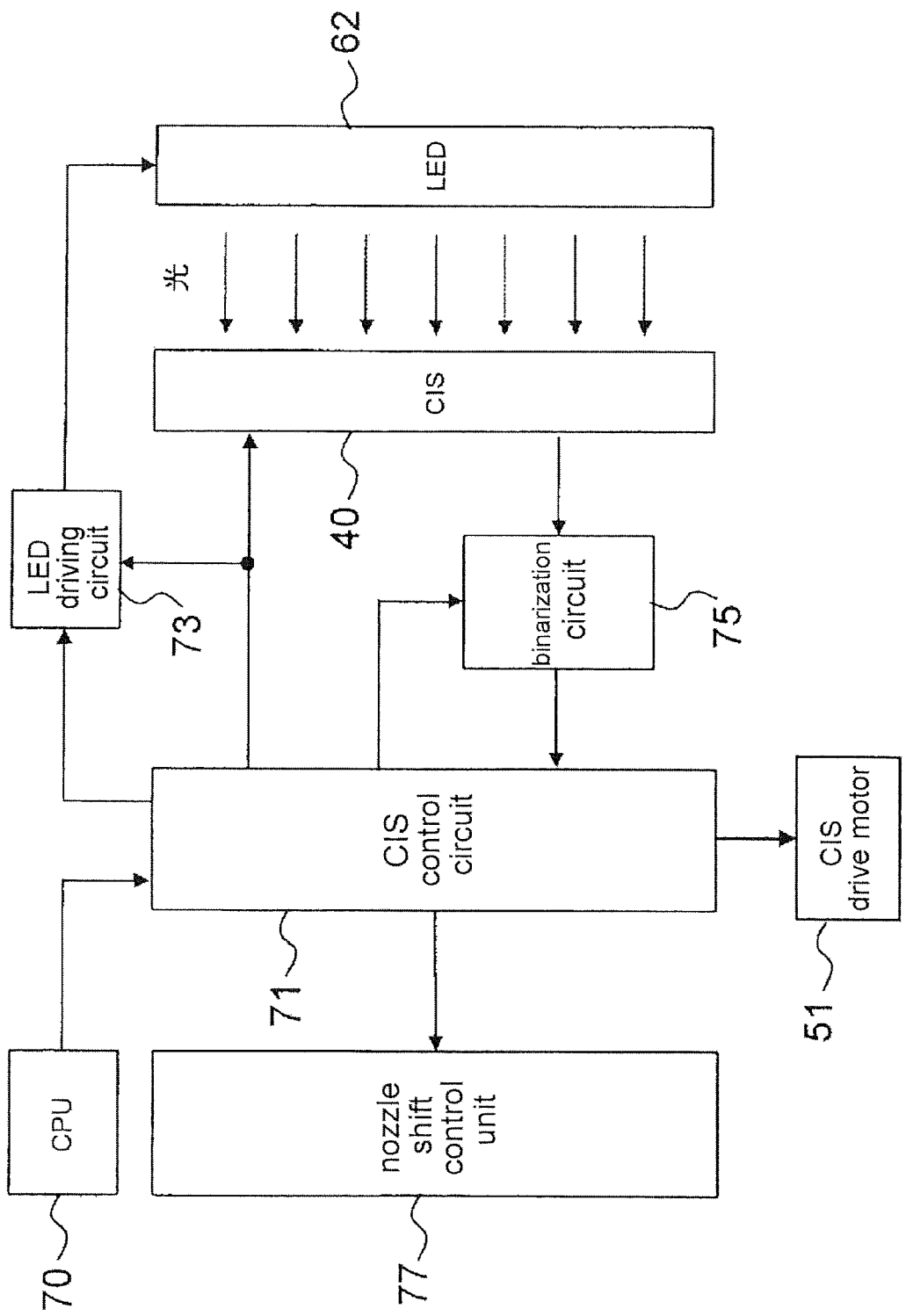
FIG. 12 is a block diagram showing a control path for the printer 100 of the first embodiment of the present disclosure.

FIG. 12 is a block diagram showing a control path for the printer 100 of this embodiment. A CPU 70 controls the entire of the printer 100 in an integrated manner. When the printer 100 starts a printing operation on the paper sheet P in response to print data received from an external computer or the like, the CPU 70 performs various types of setting for a CIS control circuit 71 to read a signal from the CIS 40. In addition, the CPU 70 sends a control signal to a CIS drive motor 51 (see FIG. 2) of the carriage moving mechanism 50 based on sheet size information contained in the received print data, so as to move the CIS carriage 35 in the sensor unit 30 by a predetermined amount.

In accordance with content set by the CPU 70, the CIS control circuit 71 sends to the CIS 40 a reference clock signal for reading a signal from the CIS 40 and a storage time determining signal for determining charge storage time in the CIS 40. In addition, the CIS control circuit 71 sends a PWM signal to an LED driving circuit 73 so as to set a current value to be supplied to the LED 62. The LED driving circuit 73 generates a DC voltage corresponding to a PWM signal from the CIS control circuit 71 and regards this as a reference voltage for the current to be supplied to the LED 62. In addition, the CIS control circuit 71 generates a comparison reference voltage (threshold value voltage) for binarizing an analog signal (output signal) from the CIS 40 with a binarization circuit 75.

At timing when the paper sheet P waiting at the registration roller pair 13 (see FIG. 3) is to be conveyed to the recording unit 9 (see FIG. 1), the CPU 70 instructs the CIS control circuit 71 to detect the edge position. When receiving the instruction to detect the edge position from the CPU 70, the CIS control circuit 71 sends to the LED driving circuit 73 a control signal to turn on the LED 62 in synchronization with the storage time determining signal. The LED driving circuit 73 turns on the LED 62 for a certain period according to the control signal from the CIS control circuit 71.

The CIS 40 outputs voltages corresponding to light amounts stored in pixels (photoelectric conversion elements) of a pixel group of the light receiving part 43 during an ON period of the LED 62, by the next storage time determining signal and the reference clock signal, one by one pixel, as output signals. Each of the output signals output from the CIS 40 is compared with the comparison reference voltage (threshold value voltage) to be binarized by the binarization circuit 75 and is input as a digital signal to the CIS control circuit 71.

As to each of the output signals output from the CIS 40, the CIS control circuit 71 checks 0 or 1 value of the digital signal binarized by the binarization circuit 75, one by one pixel. Further, the CIS control circuit 71 detects a pixel position of the light receiving part 43 (position of the photoelectric conversion element) at which the value of the digital signal changes from 0 to 1, or 1 to 0.

When the CIS control circuit 71 detects the pixel position at which the value of the digital signal changes, it determines that the pixel position is the edge position of the paper sheet P in the width direction. The CPU 70 calculates a deviation amount between the edge position determined by the CIS control circuit 71 and an edge position (reference edge position) in the case where the paper sheet P is conveyed with an ideal convey position (reference convey position) passing the center position of a paper feeding area. The calculated deviation amount is sent to a nozzle shift control unit (control unit) 77. The nozzle shift control unit 77 shifts a use area of the ink ejection nozzles of the line heads 10C to 10K in the recording unit 9 according to the received deviation amount of the paper sheet P in the width direction.

As described above, this embodiment is provided with the CIS 40 for detecting an edge position of the paper sheet P, and the illumination device 60 disposed to face the CIS 40 in the sheet conveying path 12 so as to emit light toward the CIS 40. In this way, an edge position of the paper sheet P can be detected based on a light intensity difference of the CIS 40 between presence and absence of the paper sheet P. In other words, there is no possibility that an edge position of the paper sheet P cannot be detected due to color of the paper sheet P.

In addition, the illumination device 60 includes the LED 62 that emits light, and the diffuser 65 that diffuses the light from the LED 62 and suppresses luminance unevenness. In this way, even if the light emitted from the LED array 61 has unevenness, the diffuser 65 can uniformize the light, and hence it is possible to reduce an increase in the light intensity difference of the CIS 40 due to light unevenness. Therefore, an edge position of the paper sheet P can be accurately detected.

In addition, as described above, when using the LED array 61 including the plurality of LEDs 62 arranged at a predetermined space in the sheet width direction, the intensity of light emitted from the LED array 61 has unevenness in the sheet width direction. Therefore, it is particularly effective to apply the present disclosure (to dispose the diffuser 65) when using the LED array 61.

In addition, as described above, the plurality of LEDs 62 emit light in parallel to the mount surface 63*a* of the LED substrate 63 and along the sheet conveying direction. In this way, the LED substrate 63 can be disposed substantially in parallel to the sheet conveying path 12, and hence it is possible to reduce an increase in size of the sensor unit 30 in a direction perpendicular to the sheet conveying direction (in the up/down direction).

In addition, as described above, when using the CIS 40 including the plurality of light receiving parts 43 and the rod lens array 46 disposed to face the light receiving parts 43, if the light receiving parts 43 is positionally deviated from the rod lens array 46 in the sheet conveying direction, the light intensity received by the light receiving part 43 is decreased. In this way, if there is a light receiving part 43 that is positionally deviated from the rod lens array 46, an output difference (light intensity difference of the received light) of the CIS 40 in the sheet width direction is increased, and hence accuracy of detection of an edge position of the paper sheet P by the CIS 40 is lowered. Therefore, it is particularly effective to apply the present disclosure (to dispose the diffuser 65) when using the CIS 40 including the plurality of light receiving parts 43 and the rod lens array 46, and it is possible to reduce an increase in the output difference (light intensity difference of the received light) of the CIS 40 in the sheet width direction.

In addition, as described above, an image forming position in the sheet width direction by the recording unit 9 is corrected based on the edge position of the paper sheet P detected by the sensor unit 30. In this way, image positional deviation with respect to the paper sheet P can be easily reduced, and hence deterioration of image quality can be easily suppressed.

Second Embodiment

Figure 13:
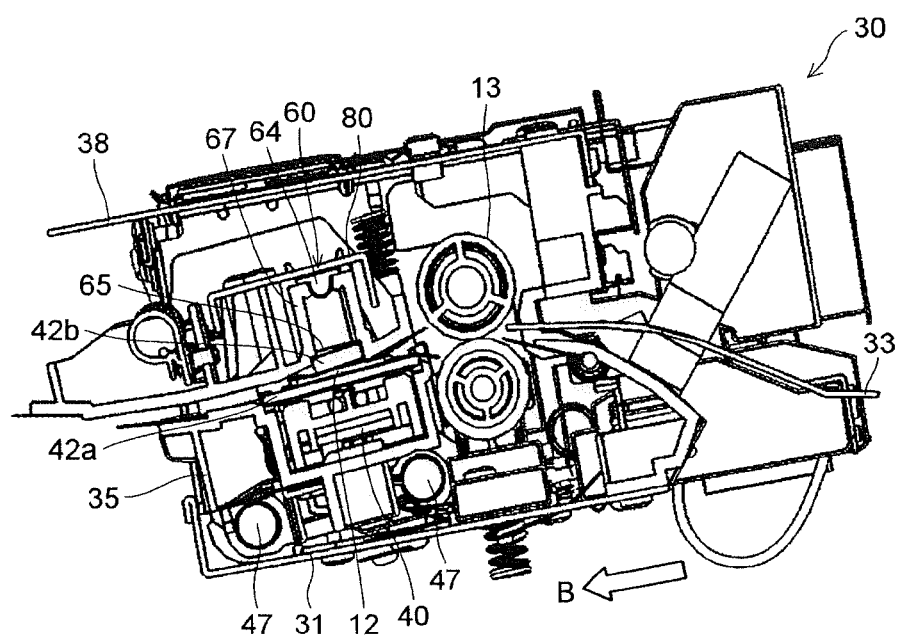
FIG. 13 is a cross-sectional side view of the sensor unit 30 of a second embodiment of the present disclosure.
Figure 14:
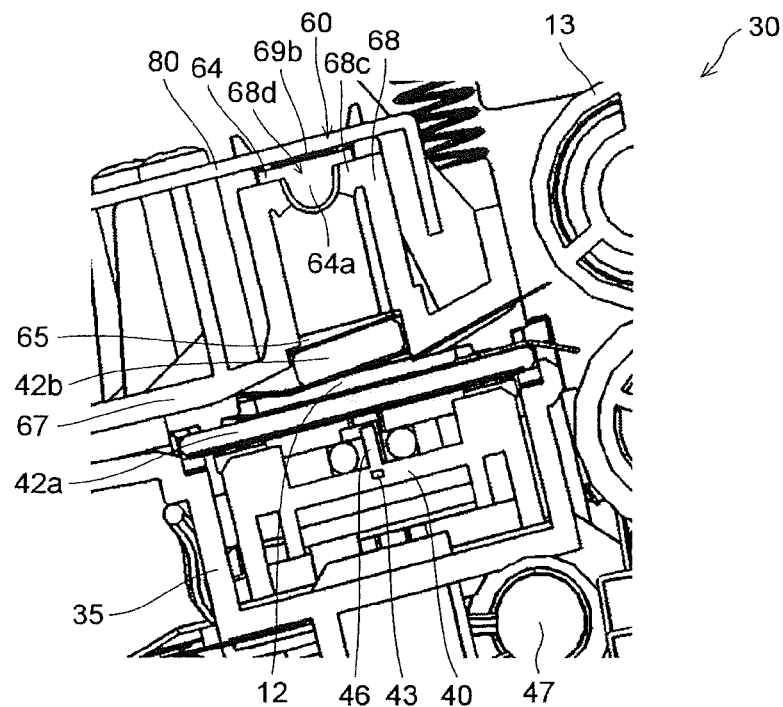
FIG. 14 is a cross-sectional side view showing a structure of the illumination device 60 and its vicinity of the sensor unit 30 of the second embodiment of the present disclosure.

As shown in FIGS. 13 and 14, in the sensor unit 30 according to a second embodiment of the present disclosure, the illumination device 60 includes one LED (light source) 62 disposed at one end portion in the sheet width direction (see FIG. 15), a light guide 64 that extends in the sheet width direction and guides the light emitted from the LED 62 in the sheet width direction to emit the light toward the CIS 40, the sheet-like diffuser 65 that diffuses the light from the light guide 64 to irradiate the CIS 40, and the illumination case 67 that retains them.

The illumination case 67 has a function as a sheet guide constituting a part of the sheet conveying path 12, and a function as a light guide holding member that holds the light guide 64. The illumination case 67 includes the stay 68 protruding in a direction retreating from the sheet conveying path 12 (in the upward direction). The stay 68 extends in the sheet width direction and is formed to have a substantially rectangular cross section opening downward and surrounded by the upper surface portion 68c and a pair of side surface portions. The upper surface portion 68c of the stay 68 is provided with a slit 68d formed to extend in the sheet width direction, and a light guide portion 64a of the light guide 64 described later is disposed in the slit 68d.

Figure 15:
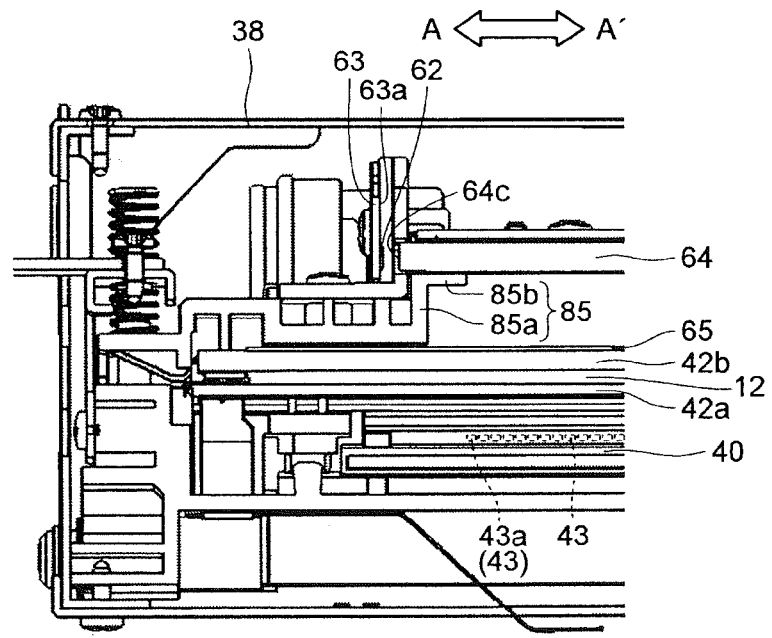
FIG. 15 is a cross-sectional view showing a structure of an LED 62 and its vicinity of the sensor unit 30 of the second embodiment of the present disclosure.

As shown in FIG. 15, the LED 62 is mounted on the mount surface 63a of the LED substrate 63. The LED 62 emits light perpendicularly to the mount surface 63a of the LED substrate 63, unlike the first embodiment described above.

Figure 16:
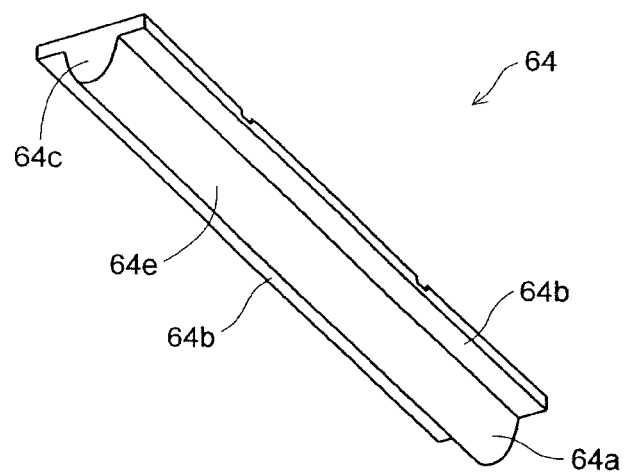
FIG. 16 is a perspective view showing a structure of a light guide 64 of the sensor unit 30 of the second embodiment of the present disclosure, viewed from a light emitting surface 64e side.
Figure 17:
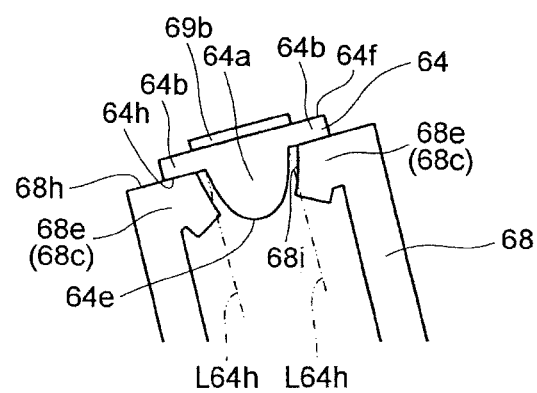
FIG. 17 is a cross-sectional side view showing a structure of the light guide 64 and its vicinity of the sensor unit 30 of the second embodiment of the present disclosure.
Figure 18:
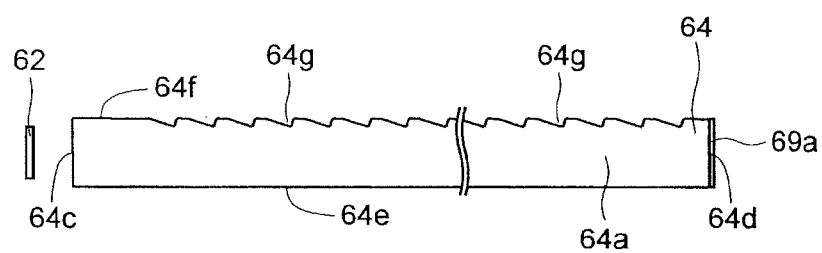
FIG. 18 is a cross-sectional view showing a structure of the light guide 64 and its vicinity of the sensor unit 30 of the second embodiment of the present disclosure.

As shown in FIGS. 16 and 17, the light guide 64 includes the light guide portion 64a extending in the sheet width direction so as to guide light, and a pair of flange portions 64b, which is formed integrally with the light guide portion 64a, so as to protrude from a back surface 64f described later on both sides in a direction perpendicular to the sheet width direction (right and left direction in FIG. 13) and extend in the sheet width direction. The light guide portion 64a is formed in a U shape bulging from the flange portion 64b. In addition, as shown in FIGS. 16 and 18, the light guide portion 64a is disposed to face the LED 62 and has a light incident surface 64c for the light from the LED 62 to enter, an opposite surface 64d provided at the other end portion on the opposite side to the LED 62 (see FIG. 18), a light emitting surface 64e disposed on the side surface on the CIS 40 side (lower side) constituted of a curved surface that emits the light entering the light incident surface 64c toward the sheet conveying path 12, and the back surface (upper surface) 64f disposed to face the light emitting surface 64e.

The opposite surface 64d is provided with a reflector plate 69a that reflects light going out from the opposite surface 64d to reenter the light guide 64. The back surface 64f is provided with a plurality of concave prisms 64g arranged in the sheet width direction so as to totally reflect the light entering from the light incident surface 64c to the light emitting surface 64e.

As shown in FIGS. 14 and 15, the diffuser 65 is supported by the upper surface of the contact glass 42b. In addition, both end portions of the diffuser 65 in the sheet width direction and the sheet conveying direction upstream end portion of the same are sandwiched between the contact glass 42b and the illumination case 67. In this way, the number of components can be reduced compared with the case using an additional member for supporting the diffuser 65.

The light emitted from the LED 62 enters the light guide 64 and goes out toward the sheet conveying path 12 while being guided in the sheet width direction while, is diffused by the diffuser 65, passes through the contact glasses 42b and 42a, and irradiates the CIS 40. Note that the diffuser 65 of this embodiment is a transmission type diffuser that transmits the light from the light guide 64.

Figure 19:
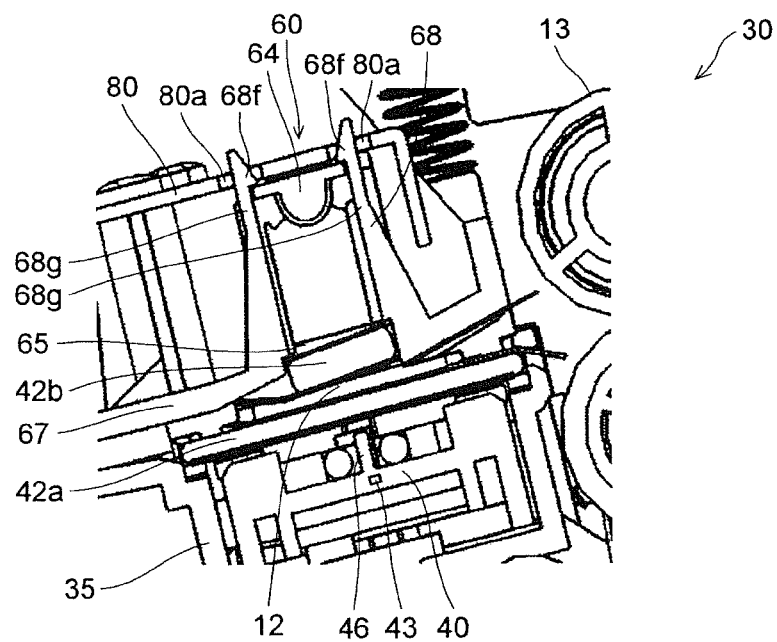
FIG. 19 is a cross-sectional side view showing a structure of the illumination device 60 and its vicinity of the sensor unit 30 of the second embodiment of the present disclosure.

As shown in FIGS. 17 and 19, the stay 68 includes a pair of support portions 68e that support a supported surface 64h of the flange portion 64b of the light guide 64 on the CIS 40 side, and a plurality of pairs of engagement pieces 68g disposed to protrude upper than the support portion 68e so as to engage with the flange portion 64b.

The pair of support portions 68e are formed to extend in the sheet width direction and has a function as a light shielding member, which shields light when the LED light entering the flange portion 64b from the light guide portion 64a or ambient light entering the flange portion 64b from the back surface 64f further goes out from the flange portion 64b toward the sheet conveying path 12. In this way, the light leaking from the flange portion 64b can be prevented from entering the CIS 40, and hence it is possible to prevent misdetection of an edge position of the paper sheet P by the CIS 40 due to light leaking from the flange portion 64b. The illumination case 67 is made of opaque resin and has a function of shielding light. Therefore, the entire support portion 68e constitutes a light shielding portion that shields light. Note that the flange portion 64b has a notch 64i described later and an ejector mark (not shown) formed when the light guide 64 is pulled out from the mold, and hence the light leaking from the flange portion 64b is not uniform in the sheet width direction.

As shown in FIG. 17, the support portion 68e includes a support surface 68h for supporting the supported surface 64h of the flange portion 64b of the light guide 64, and a facing surface 68i disposed to face the light emitting surface 64e of the light guide 64 with a predetermined gap. The facing surface 68i is curved along the light emitting surface 64e. In other words, the facing surface 68i is inclined in such a manner that the distance between the facing surfaces 68i becomes smaller as being farther from the flange portion 64b. The facing surface 68i is disposed to cross a line L64h extending perpendicular to the supported surface 64h from the end portion of the supported surface 64h on the light guide portion 64a side. In this way, the light going out from the end portion of the supported surface 64h of the flange portion 64b on the light guide portion 64a side can be prevented from propagating toward the CIS 40 without passing through the support portion 68e. In other words, the light leaking from the gap between the light emitting surface 64e and the facing surface 68i can be reflected and uniformized by the facing surface 68i and the inner surface of the stay 68. Therefore, misdetection by the CIS 40 due to the light leaking from the flange portion 64b can be prevented more.

Figure 20:
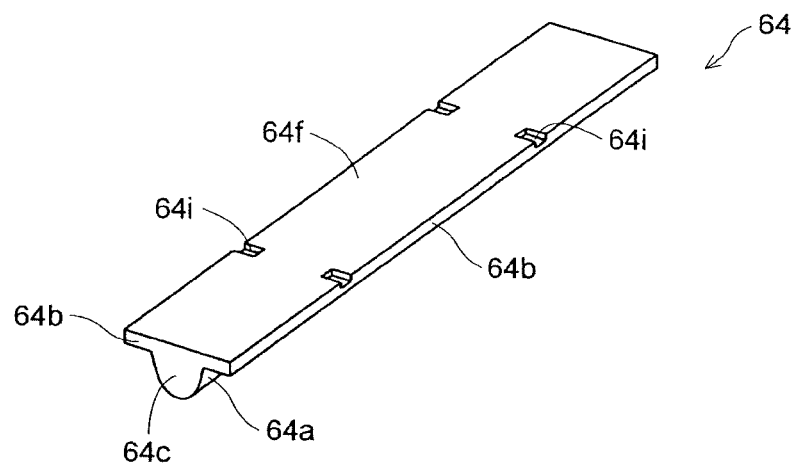
FIG. 20 is a perspective view showing a structure of the light guide 64 of the sensor unit 30 of the second embodiment of the present disclosure, viewed from a back surface 64f side.

As shown in FIG. 19, the engagement piece 68g is formed to have a so-called snap-fit structure, including engaging pawls 68f that engage the surface (upper surface) of the flange portion 64b on the opposite side to the CIS 40 and is disposed at the tip portion, and it can be elastically deformed in a direction perpendicular to the protruding direction (the right and left direction in FIG. 19 or the sheet conveying direction). The pair of engagement pieces 68g shown in FIG. 19 are disposed at two positions in the sheet width direction. Note that, as shown in FIG. 20, the upper surface (back surface 64f) of the flange portion 64b is provided with a plurality of the notches (engaging recesses) 64i that engage the engaging pawls 68f. In this way, positional deviation of the light guide 64 from the engagement piece 68g can be prevented. Note that the prisms 64g are not shown in FIG. 20 for simple illustration.

As shown in FIG. 17, the back surface 64f of the light guide 64 is provided with a reflector plate 69b, which reflects the light going out from the light guide 64 toward the light emitting surface 64e so that the light can reenter the light guide 64. In addition, as shown in FIG. 14, a reflector plate holding member 80 made of metal sheet, which sandwiches and holds the reflector plate 69b with the light guide 64, is disposed to cover the back surface 64f side (upper side) of the light guide 64. The reflector plate holding member 80 is fixed to the illumination case 67 with screws. As shown in FIG. 19, the reflector plate holding member 80 is provided with a plurality of apertures 80a in which the engaging pawls 68f of the engagement piece 68g are inserted.

In addition, as shown in FIG. 13, the opposite side to the light guide 64 (upper side) of the reflector plate holding member 80 is provided with a unit cover (cover member) 38 made of metal sheet, which shields light from outside of the sensor unit 30 (ambient light). In this way, the light outside the sensor unit 30 can be prevented from reaching the CIS 40 via the aperture 80a, and hence it is possible to prevent misdetection of an edge position of the paper sheet P by the CIS 40 due to light from outside of the sensor unit 30.

As shown in FIG. 15, a light emission surface 62a of the LED 62 that emits light (see FIG. 21) is disposed at a position apart from the light incident surface 64c of the light guide 64 by 1 mm or more. In this way, the light going out from the end portion of the light guide 64 on the LED 62 side (left end portion in FIG. 15) can be prevented from being particularly increased more than the light going out from other part of the light guide 64, and hence it is possible to prevent occurrence of a local peak in a received light amount in the light receiving part 43 of the CIS 40 on the LED 62 side (left side).

In addition, a light shielding piece 85, which shields the light entering directly from the LED 62 to the light receiving part 43, is disposed between the LED 62 and the light receiving part 43 of the CIS 40. In this way, the light emitted from the LED 62 can be prevented from entering the light receiving part 43 without passing through the light guide 64, and hence it is possible to prevent occurrence of a local peak in the received light amount in the CIS 40. Therefore, an edge position of the paper sheet P can be accurately detected. Note that the light shielding piece 85 is formed integrally with the illumination case 67. In addition, the light shielding piece 85 is an example of the "light shielding member" of the present disclosure.

Figure 21:
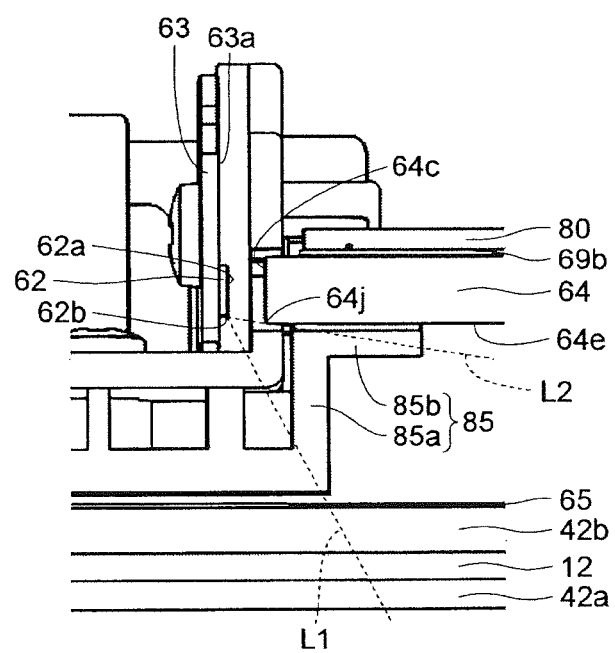
FIG. 21 is a cross-sectional view showing a structure of the LED 62 and its vicinity of the sensor unit 30 of the second embodiment of the present disclosure.

As shown in FIG. 21, the line passing a first end portion 62b on the CIS 40 side (lower side) of the light emission surface 62a of the LED 62 and an LED side light receiving part (light source side light receiving part) 43a disposed on the side closest to the LED 62 (left side) of the light receiving part 43 (see FIG. 15) is referred to as a first line L1. In addition, the line passing the first end portion 62b and a second end portion 64j of the light incident surface 64c of the light guide 64 on the CIS 40 side (lower side) is referred to as a second line L2. In this case, the light shielding piece 85 is disposed to cover the first line L1 to the second line L2. In other words, the light shielding piece 85 is disposed to shield light propagating from LED 62 to the region between the first line L1 and the second line L2. In this way, the light emitted from the LED 62 can be securely prevented from entering the light receiving part 43 without passing through the light guide 64.

In addition, the light shielding piece 85 is formed to have an L-shaped cross section, including a first light shielding portion 85a extending in parallel to the light incident surface 64c, and a second light shielding portion 85b extending in parallel to the light emitting surface 64e from the upper end of the first light shielding portion 85a toward the inside in the sheet width direction. In this way, the light emitted from the LED 62 can be easily prevented from entering the light receiving part 43 without passing through the light guide 64. In addition, by disposing the second light shielding portion 85b, it is possible to shield light having high intensity going out from the end portion of the light guide 64 on the LED 62 side, and hence occurrence of a local peak in the received light amount in the light receiving part 43 of the CIS 40 on the LED 62 side can be prevented more.

Figure 22:
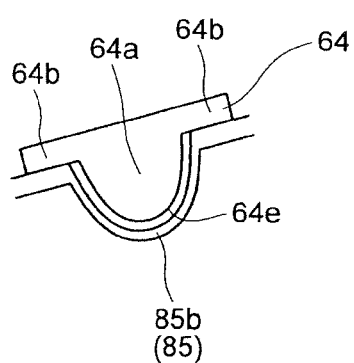
FIG. 22 is a cross-sectional side view showing a structure of a light shielding piece 85 and its vicinity of the sensor unit 30 of the second embodiment of the present disclosure.

In addition, as shown in FIG. 22, the second light shielding portion 85b is formed in a U shape to cover the entire region of the light emitting surface 64e of the light guide 64, viewed from the sheet width direction. In this way, light having high intensity going out from near the end portion of the light guide 64 on the LED 62 side can be securely shielded by the second light shielding portion 85b.

Other structures in the second embodiment are the same as those in the first embodiment described above.

In this embodiment, as described above, by using the light guide 64 for guiding the light from the LED 62, compared with the case using the LED array 61, occurrence of unevenness in intensity of light going out from the illumination device 60 can be prevented more. Further, by using the transmission type diffuser 65 that transmits light from the light guide 64, as the diffuser 65, the light from the light guide 64 can be easily diffused and guided to the sheet conveying path 12.

In addition, as described above, the diffuser 65 is supported by the contact glass 42b. In this way, compared with the case using an additional member for supporting the diffuser 65, the number of components can be reduced.

In addition, as described above, this embodiment is provided with the CIS 40 for detecting an edge position of the paper sheet P, and the illumination device 60 disposed to face the CIS 40 via the sheet conveying path 12 so as to emit light toward the CIS 40. In this way, an edge position of the paper sheet P can be detected based on a light intensity difference of the CIS 40 between presence and absence of the paper sheet P. In other words, there is no possibility that an edge position of the paper sheet P cannot be detected due to color of the paper sheet P.

In addition, the light shielding piece 85, which shields the light entering directly from the LED 62 to the light receiving part 43, is disposed between the LED 62 and the light receiving part 43. In this way, the light emitted from the LED 62 is prevented from entering the light receiving part 43 without passing through the light guide 64, and hence it is possible to prevent occurrence of a local peak in a received light amount in the CIS 40. Therefore an edge position of the paper sheet P can be accurately detected.

In addition, as described above, the line passing the first end portion 62b of the light emission surface 62a on the CIS 40 side and an LED side light receiving part 43a disposed on the side closest to the LED 62 of the light receiving part 43 is referred to as the first line L1, and the line passing the first end portion 62b and the second end portion 64j of the light incident surface 64c of the light guide 64 on the CIS 40 side is referred to as the second line L2. Then, the light shielding piece 85 is disposed to shield light propagating from LED 62 to the region between the first line L1 and the second line L2. In this way, the light emitted from the LED 62 can be securely prevented from entering the light receiving part 43 without passing through the light guide 64.

In addition, as described above, the light shielding piece 85 is formed in the illumination case 67 holding the light guide 64. In this way, compared with the case where the light shielding piece 85 is disposed separately from the illumination case 67, the number of components can be reduced.

In addition, as described above, the light shielding piece 85 is formed to have an L-shaped cross section, including the first light shielding portion 85a extending in parallel to the light incident surface 64c, and the second light shielding portion 85b extending in parallel to the light emitting surface 64e from the end portion of the first light shielding portion 85a. In this way, the light emitted from the LED 62 can be easily prevented from entering the light receiving part 43 without passing through the light guide 64. In addition, by disposing the second light shielding portion 85b, it is possible to shield light having high intensity going out from the end portion of the light guide 64 on the LED 62 side, and hence it is possible to prevent occurrence of a local peak in a received light amount in the light receiving part 43 of the CIS 40 on the LED 62 side. Therefore, an edge position of the paper sheet P can be detected more accurately.

In addition, as described above, the second light shielding portion 85b is disposed to cover the entire region of the light emitting surface 64e of the light guide 64, viewed from the sheet width direction. In this way, the light having high intensity going out from near the end portion of the light guide 64 on the LED 62 side can be securely shielded by the second light shielding portion 85b.

In addition, as described above, the LED 62 is disposed at the position apart from the light incident surface 64c of the light guide 64 by 1 mm or more. In this way, the light going out from the end portion of the light guide 64 on the LED 62 side (left end portion in FIG. 11) can be prevented from being particularly increased more than the light going out from other part of the light guide 64, and hence it is possible to prevent occurrence of a local peak in the received light amount in the light receiving part 43 of the CIS 40 on the LED 62 side (left side). Therefore, an edge position of the paper sheet P can be detected more accurately.

In addition, as described above, the image forming position in the sheet width direction by the recording unit 9 is corrected based on the edge position of the paper sheet P detected by the sensor unit 30. In this way, an image positional deviation with respect to the paper sheet P can be easily reduced, and hence deterioration of image quality can be easily suppressed.

In addition, as described above, this embodiment is provided with the CIS 40 for detecting an edge position of the paper sheet P, and the illumination device 60 disposed to face the CIS 40 via the sheet conveying path 12 so as to emit light toward the CIS 40. In this way, an edge position of the paper sheet P can be detected based on a light intensity difference of the CIS 40 between presence and absence of the paper sheet P. In other words, there is no possibility that an edge position of the paper sheet P cannot be detected due to color of the paper sheet P.

In addition, the illumination case 67 includes the support portion 68e extending in the sheet width direction so as to support the supported surface 64h of the flange portion 64b, and the support portion 68e shields light going out from the supported surface 64h of the flange portion 64b toward the CIS 40. In this way, the light leaking from the flange portion 64b of the light guide 64 can be prevented from entering the CIS 40, and hence it is possible to prevent misdetection of an edge position of the paper sheet P by the CIS 40 due to the light leaking from the flange portion 64b of the light guide 64. Therefore an edge position of the paper sheet P can be accurately detected.

In addition, as described above, the illumination case 67 includes the engagement pieces 68g that have the engaging pawls 68f to engage with the notches 64i formed in the flange portion 64b and can be elastically deformed along the sheet conveying direction. In this way, by elastically deforming the engagement pieces 68g, the light guide 64 can be easily held. Note that when the notches 64i are formed in the flange portion 64b, the light leaking from the flange portion 64b is not uniform, and hence it is particularly effective to dispose the support portion 68e that shields light going out from the supported surface 64h of the flange portion 64b.

In addition, as described above, the unit cover 38 for shielding ambient light (light from outside) entering the light guide 64 is disposed to cover the reflector plate 69b side (back surface 64f side) of the light guide 64. In this way, external light of the sensor unit 30 can be prevented from reaching the CIS 40, and hence it is possible to prevent misdetection of an edge position of the paper sheet P by the CIS 40 due to light from outside of the sensor unit 30. Therefore, it is possible to suppress a decrease in detection accuracy of an edge position of the paper sheet P by the CIS 40.

In addition, as described above, the facing surface 68i of the support portion 68e is inclined in such a manner that the distance between the facing surfaces 68i becomes smaller as being farther from the flange portion 64b. In this way, the light going out from the end portion of the supported surface 64h of the flange portion 64b on the light guide portion 64a side can be prevented from propagating toward the CIS 40 without passing through the support portion 68e. In other words, the light leaking from the gap between the light emitting surface 64e and the facing surface 68i can be reflected by the facing surface 68i and the inner surface of the stay 68 and can be uniformized. Therefore, misdetection of the CIS 40 due to the light leaking from the flange portion 64b can be suppressed more.

In addition, as described above, the image forming position in the sheet width direction by the recording unit 9 is corrected based on the edge position of the paper sheet P detected by the sensor unit 30. In this way, image positional deviation with respect to the paper sheet P can be easily suppressed, and hence deterioration in image quality can be easily suppressed.

Other effects of the second embodiment are the same as those of the first embodiment described above.

Other than that, the present disclosure is not limited to the embodiments described above and can be variously modified within the scope not deviating from the spirit of the present disclosure. For instance, the first embodiment described above shows an example, in which the LED array 61 is disposed to emit light along the sheet conveying direction, and the reflection type diffuser is used as the diffuser 65, but the present disclosure is not limited to this. It may be possible to dispose the LED array 61 to emit light perpendicularly to the sheet conveying path 12, and to use a transmission type diffuser as the diffuser 65.

In addition, for example, the second embodiment shows an example, in which the light guide 64 is disposed to emit light perpendicularly to the sheet conveying path 12, and the transmission type diffuser is used as the diffuser 65, but the present disclosure is not limited to this. It may be possible to dispose the light guide 64 to emit light along the sheet conveying direction, and to use a reflection type diffuser as the diffuser 65 so that the light from the light guide 64 is reflected toward the CIS 40.

Third Embodiment

Figure 23:
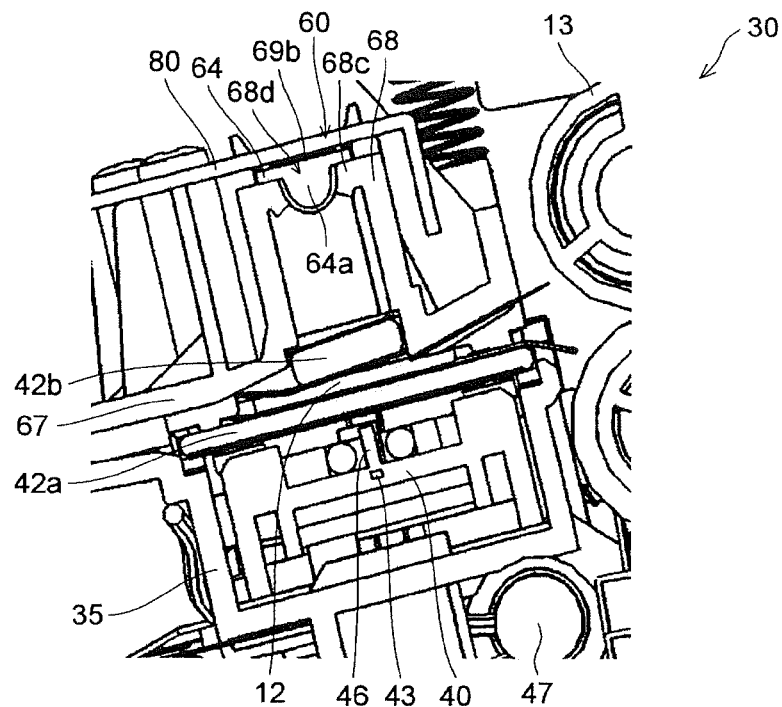
FIG. 23 is a cross-sectional side view showing a structure of the illumination device 60 and its vicinity of the sensor unit 30 of a third embodiment of the present disclosure.
Figure 24:
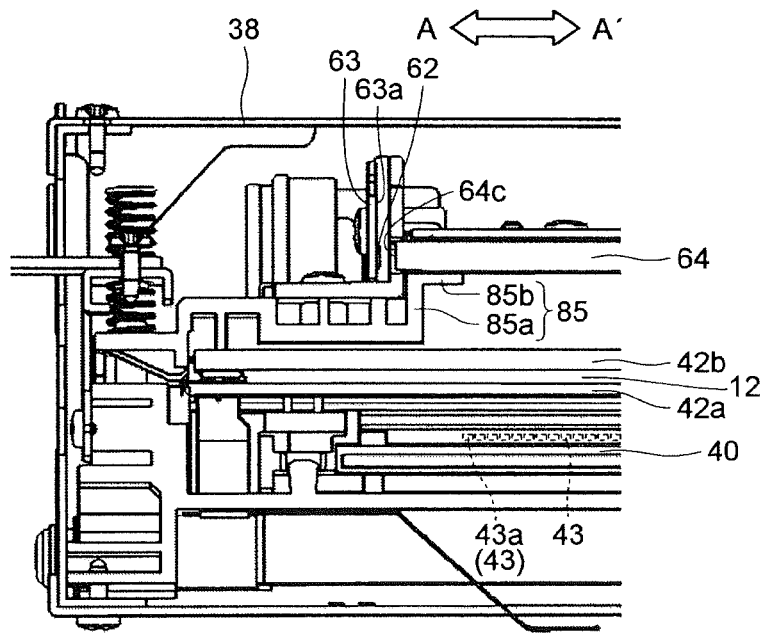
FIG. 24 is a cross-sectional view showing a structure of the LED 62 and its vicinity of the sensor unit 30 of the third embodiment of the present disclosure.

As shown in FIGS. 23 and 24, the illumination device 60 according to a third embodiment of the present disclosure includes one LED (light source) 62 disposed at one end portion in the sheet width direction, the light guide 64 extending in the sheet width direction so as to guide the light emitted from the LED 62 in the sheet width direction and emit the light to the CIS 40, and the illumination case 67 to hold them.

This embodiment is not provided with the diffuser 65 unlike the second embodiment.

The illumination case 67 has a function as a sheet guide constituting a part of the sheet conveying path 12, and a function as a light guide holding member to hold the light guide 64.

As shown in FIG. 24, the LED 62 is mounted on the mount surface 63a of the LED substrate (light source substrate) 63. The LED 62 emits light perpendicularly to the mount surface 63a of the LED substrate 63. Note that the LED substrate 63 is fixed to the illumination case 67 with screws. In addition, the contact glass 42b is fixed to the illumination case 67 with clips or the like (not shown).

The prisms 64g (see FIG. 18) are arranged in the sheet width direction at a pitch smaller than that of the light receiving parts 43. In addition, the prisms 64g are arranged in the sheet width direction at a pitch smaller than that of the rod lenses constituting the rod lens array 46. The prisms 64g are formed at a pitch of approximately 30 to 400 µm in the sheet width direction. In this example, the prisms 64g are formed in such a manner that the pitch is gradually decreased from approximately 400 µm to approximately 30 µm from the light incident surface 64c side to the opposite surface 64d side. The light receiving parts 43 and the rod lenses are each formed at a pitch of approximately 1 mm in the sheet width direction.

The light emitted from the LED 62 enters the light guide 64, goes out toward the sheet conveying path 12 while being guided in the sheet width direction, and passes contact glasses 42b and 42a so as to irradiate the CIS 40.

Other parts of the third embodiment are the same as those of the second embodiment described above.

As described above, this embodiment is provided with the CIS 40 for detecting an edge position of the paper sheet P, and the illumination device 60 disposed to face the CIS 40 via the sheet conveying path 12 so as to emit light toward the CIS 40. In this way, an edge position of the paper sheet P can be detected based on a light intensity difference of the CIS 40 between presence and absence of the paper sheet P. In other words, there is no possibility that an edge position of the paper sheet P cannot be detected due to color of the paper sheet P. Therefore, the CIS 40 can accurately detect an edge position of the paper sheet P.

In addition, the plurality of concave prisms 64g are formed on the back surface 64f of the light guide 64. In this way, unlike the case where a plurality of convex prisms are formed on the back surface 64f of the light guide 64, a major part of light entering the light incident surface 64c goes out from the light emitting surface 64e without temporarily going out from the back surface 64f. Therefore utilization efficiency of light can be prevented from decreasing. Note that, in the structure in which a plurality of convex prisms are formed on the back surface 64f of the light guide 64, a major part of light entering the light incident surface 64c temporarily goes out from the back surface 64f, is reflected by the reflector plate 69b, reenters the light guide 64, and then goes out from the light emitting surface 64e. In this case, a part of light going out from the back surface 64f may not reach the reflector plate 69b or may be absorbed by the reflector plate 69b, or may be reflected by the back surface 64f of the light guide 64, resulting in decrease in the utilization efficiency of light.

In addition, as described above, the prisms 64g are arranged in the sheet width direction at a pitch smaller than that of the light receiving parts 43. In this way, an increase in an intensity difference of light going out from the light guide 64 in the sheet width direction (unevenness of light going out from the light guide 64) can be effectively suppressed, and hence an increase in an intensity difference of light received by the light receiving parts 43 can be effectively suppressed. Therefore, detection accuracy of an edge position of the paper sheet P by the CIS 40 can be effectively improved.

In addition, as described above, the LED 62 is disposed at a position apart from the light incident surface 64c of the light guide 64 by 1 mm or more. In this way, the light going out from the end portion of the light guide 64 on the LED 62 side (left end portion in FIG. 24) can be prevented from being particularly increased more than the light going out from other part of the light guide 64, and thus it is possible to prevent occurrence of a local peak in a received light amount at the light receiving part 43 of the CIS 40 on the LED 62 side (left side). Therefore, the CIS 40 can detect an edge position of the paper sheet P more accurately.

In addition, as described above, the image forming position in the sheet width direction by the recording unit 9 is corrected based on the edge position of the paper sheet P detected by the sensor unit 30. In this way, an image positional deviation with respect to the paper sheet P can be easily suppressed, and hence deterioration in image quality can be easily suppressed.

Fourth Embodiment

Figure 25:
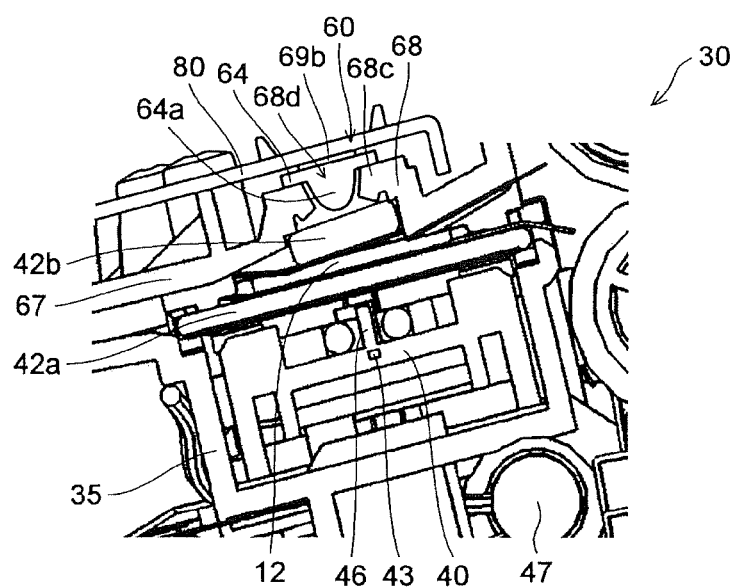
FIG. 25 is a cross-sectional side view showing a structure of the illumination device 60 and its vicinity of the sensor unit 30 of a fourth embodiment of the present disclosure.

As shown in FIG. 25, in the sensor unit 30 according to a fourth embodiment of the present disclosure, the light guide 64 is disposed close to the contact glass 42b. Specifically, in order to prevent the light emitting surface 64e of the light guide 64 from being damaged by the contact glass 42b, the light guide 64 is disposed with a gap of approximately 1 to 2 mm from the contact glass 42b, in consideration of dimensional tolerances of the illumination case 67, the contact glass 42b, and the like. Note that if the light guide 64 is made of scratch resistant material, the light guide 64 may be disposed to contact with the contact glass 42b.

Figure 26:
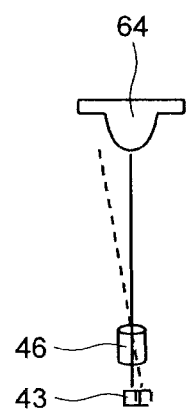
FIG. 26 is a diagram showing a state where there is a positional deviation between a light receiving part 43 and a rod lens array 46 when the light guide 64 is disposed apart from the CIS 40.

In this embodiment, as described above, the light guide 64 is disposed close to the contact glass 42b. As shown in FIG. 26, if the light receiving part 43 is positionally deviated with respect to the rod lens array 46 in the direction along the sheet conveying direction, the intensity of light received by the light receiving part 43 is decreased. Therefore, when using the CIS 40 including the plurality of light receiving parts 43 and the rod lens array 46, if there is a light receiving part 43 that is positionally deviated with respect to the rod lens array 46, an output difference of the CIS 40 (intensity difference of the received light) in the sheet width direction is increased.

Figure 27:
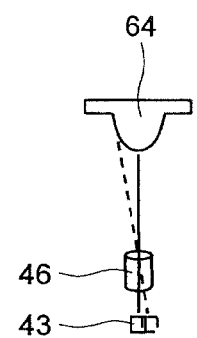
FIG. 27 is a diagram showing a state where there is a positional deviation between the light receiving part 43 and the rod lens array 46 when the light guide 64 is disposed close to the CIS 40.

However, by disposing the light guide 64 close to the contact glass 42b like this embodiment, even if the light receiving part 43 is positionally deviated with respect to the rod lens array 46 in the direction along the sheet conveying direction as shown in FIG. 27, intensity of light received by the light receiving part 43 can be prevented from decreasing. In this way, even if there is a light receiving part 43 positionally deviated with respect to the rod lens array 46, the output difference (intensity difference of received light) of the CIS 40 in the sheet width direction can be prevented from increasing. Therefore, detection accuracy of an edge position of the paper sheet P by the CIS 40 can be further prevented from decreasing.

Other effects of the fourth embodiment are the same as those of the third embodiment described above.

Other than that, the present disclosure is not limited to the embodiments described above and can be variously modified within the scope not deviating from the spirit of the present disclosure. For instance, the third embodiment described above shows the example where a diffusion member is not disposed in the illumination device 60, but the present disclosure is not limited to this. It may be possible that the illumination device 60 is provided with a sheet-like diffuser, for example, which diffuses the light from the light guide 64 so as to irradiate the CIS 40. In this case, it may be possible to dispose the diffuser on the contact glass 42b.

In addition, the third embodiment described above shows the example in which the prisms 64g of the light guide 64 are arranged in the sheet width direction at a pitch smaller than that of the light receiving parts 43, but the present disclosure is not limited to this. It may be possible to dispose the prisms 64g of the light guide 64 in the sheet width direction at a pitch larger than that of the light receiving part 43. In this case, in order to uniformize the light going out from the light guide 64, it is preferred to provide the illumination device 60 with a diffusion member.

In addition, the third embodiment described above shows the example in which the reflector plate 69b is disposed on the back surface 64f of the light guide 64, but the present disclosure is not limited to this. The reflector plate 69b may not be disposed on the back surface 64f of the light guide 64.

What is claimed is:

1. A sensor unit comprising:
   an edge detection sensor disposed in a conveying path of a recording medium to detect a recording medium edge position in a width direction perpendicular to a conveying direction; and
   an illumination device which is disposed to face the edge detection sensor in the conveying path and emits light toward the edge detection sensor, wherein
   the illumination device includes a light source for emitting light, a diffuser which diffuses light from the light source and suppresses luminance unevenness, a light guide which guides the light from the light source in the width direction to emit light, and a light guide holding member which holds the light guide,
   the light guide includes a light guide portion extending in the width direction so as to guide the light, a light incident surface disposed at an end portion of the light guide portion in the width direction so that the light from the light source enters the light incident surface, a light emitting surface disposed on a side surface of the light guide extending in the width direction to emit the light entering the light guide through the light incident surface, a back surface disposed to face the light emitting surface, and a flange portion formed integrally to the light guide portion so as to protrude on both sides from the back surface in the conveying direction and extend in the width direction,
   the light guide holding member includes a pair of support portions extending in the width direction so as to face each other via the light guide portion and supporting the flange portion, and
   the support portion includes a light shielding portion which shields light leaking out from the flange portion toward the edge detection sensor.

2. The sensor unit according to claim 1, wherein the diffuser is a transmission type for transmitting the light from the light guide.

3. The sensor unit according to claim 1, wherein the edge detection sensor includes a plurality of light receiving parts arranged in the width direction, and a rod lens array disposed to face the plurality of light receiving parts and disposed along the width direction, so as to guide the light from the illumination device to the plurality of light receiving parts.

4. The sensor unit according to claim 1, further comprising:
   a first transparent member constituting a first surface of the conveying path on the illumination device side; and
   a second transparent member constituting a second surface of the conveying path on the edge detection sensor side, wherein
   the diffuser is supported by the first transparent member.

5. An image forming apparatus comprising:
   the sensor unit according to claim 1;
   an image forming unit disposed on a downstream side of the sensor unit in the conveying direction and for forming an image on the recording medium; and
   a control unit which corrects an image forming position on the recording medium in the width direction by the image forming unit based on the edge position of the recording medium in width direction detected by the sensor unit.

6. The sensor unit according to claim 1, wherein
   the illumination device includes a light guide which guides the light from the light source in the width direction, and
   the light guide has a light incident surface disposed at an end portion thereof in the width direction so that the light from the light source enters the light guide through the light incident surface, a light emitting surface disposed on a side surface thereof extending in the width direction so as to emit the light entering the light guide through the light incident surface, and a back surface disposed to face the light emitting surface, the back surface being provided with a plurality of concave prisms arranged in the width direction so as to reflect the light entering the light incident surface to the light emitting surface.

7. The sensor unit according to claim 6, wherein
the edge detection sensor includes a plurality of light receiving parts arranged at a predetermined pitch in the width direction, and
the plurality of prisms are arranged in the width direction at a pitch smaller than that of the light receiving parts.

8. The sensor unit according to claim 6, further comprising:
a first transparent member constituting a first surface of the conveying path on the illumination device side; and
a second transparent member constituting a second surface of the conveying path on the edge detection sensor side, wherein
the edge detection sensor includes a plurality of light receiving parts arranged in the width direction, and a rod lens array disposed on the conveying path side of the light receiving parts along the width direction, the rod lens array guiding the light from the illumination device to the light receiving parts, and
the light guide is disposed to contact with or close to the first transparent member.

9. The sensor unit according to claim 6, wherein the light source is disposed at a position apart from the light incident surface of the light guide by 1 mm or more.

10. The sensor unit according to claim 1, wherein
the illumination device includes a light guide which guides the light from the light source in width direction,
the light guide has a light incident surface disposed at an end portion thereof in the width direction so that the light from the light source enters the light guide through the light incident surface, and a light emitting surface disposed on a side surface of the light guide extending in the width direction so as to emit the light entering the light guide through the light incident surface,
the edge detection sensor includes a plurality of light receiving parts arranged in the width direction, and
a light shielding member is disposed between the light source and the light receiving parts, so as to shield light entering the light receiving parts directly from the light source.

11. The sensor unit according to claim 10, wherein
the light source has a light emission surface to emit light, and
a line passing a first end portion of the light emission surface on the edge detection sensor side and a light source side light receiving part disposed on the side closest to the light source out of the light receiving parts is referred to as a first line, while a line passing the first end portion and a second end portion of the light incident surface of the light guide on the edge detection sensor side is referred to as a second line, and then the light shielding member is disposed to shield light propagating from the light source to a region between the first line and the second line.

12. The sensor unit according to claim 10, wherein the light shielding member is formed in the light guide holding member which holds an end portion of the light guide in the width direction.

13. The sensor unit according to claim 12, wherein the light shielding member is formed to have an L-shaped cross section, including a first light shielding portion extending in parallel to the light incident surface, and a second light shielding portion extending in parallel to the light emitting surface from an end portion of the first light shielding portion.

14. The sensor unit according to claim 13, wherein the second light shielding portion is formed in a U shape to cover the entire region of the light emitting surface of the light guide, viewed from the width direction.

15. The sensor unit according to claim 1, wherein the light guide holding member includes an engagement piece having an engaging pawl to engage an engaging recess formed in the flange portion of the light guide, and the engagement piece is elastically deformable in an engaging direction.

16. The sensor unit according to claim 1, further comprising:
a reflector plate disposed on the back surface of the light guide to reflect the light entering the light guide toward the light emitting surface, and
a cover member disposed to cover the reflector plate side of the light guide to shield ambient light entering the light guide.

17. The sensor unit according to claim 1, wherein
the support portion has a support surface which supports a supported surface of the flange portion, and a pair of facing surfaces which is disposed to face the light emitting surface of the light guide with a predetermined space therebetween,
the light guide portion is formed in a U shape bulging from the flange portion and is disposed with a gap from the facing surface, and
the pair of facing surfaces is inclined in such a manner that a distance between the pair of facing surfaces becomes smaller as being farther from the flange portion.

18. A sensor unit comprising:
an edge detection sensor disposed in a conveying path of a recording medium to detect a recording medium edge position in a width direction perpendicular to a conveying direction; and
an illumination device which is disposed to face the edge detection sensor in the conveying path and emits light toward the edge detection sensor, wherein
the illumination device includes a light source for emitting light and a diffuser which diffuses light from the light source and suppresses luminance unevenness,
the sensor unit further comprises:
a first transparent member constituting a first surface of the conveying path on the illumination device side; and
a second transparent member constituting Ming a second surface of the conveying path on the edge detection sensor side, and
the diffuser is supported by an upper surface of the first transparent member.

19. The sensor unit according to claim 18, wherein
the diffuser is supported by the upper surface of the first transparent member, with both end portions thereof in the width direction and an upstream end portion thereof in the conveying direction sandwiched between the first transparent member and the illumination device.

* * * * *